United States Patent Office 3,574,703
Patented Apr. 13, 1971

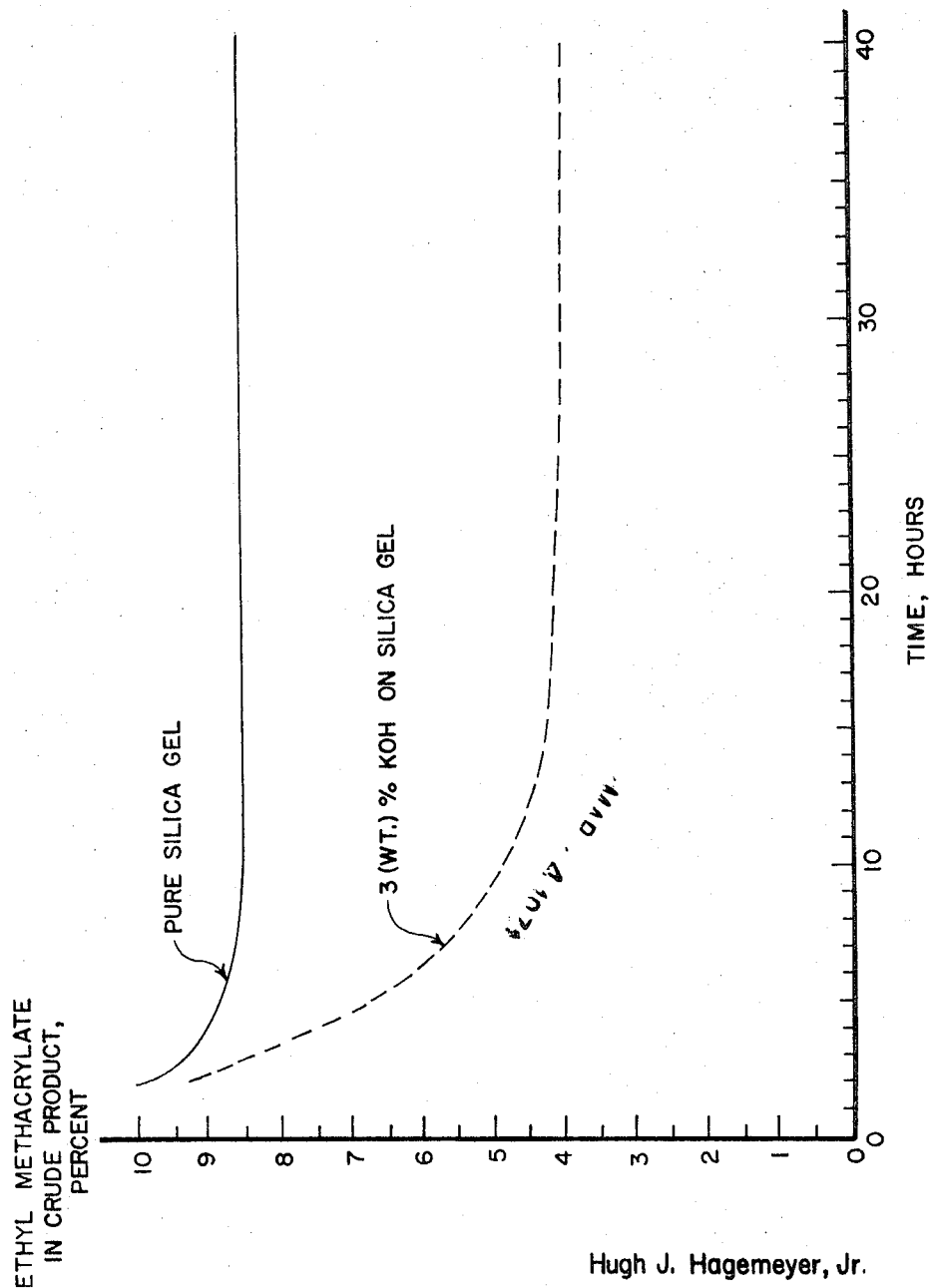

3,574,703
SYNTHESIS OF ALPHA,BETA-UNSATURATED NITRILES
Hugh J. Hagemeyer, Jr., Alden E. Blood, and Thomas C. Snapp, Jr., Longview, Tex., assignors to Eastman Kodak Company, Rochester, N.Y.
Filed Oct. 23, 1967, Ser. No. 677,393
Int. Cl. C07c *121/30, 121/32*
U.S. Cl. 260—465.9         5 Claims

ABSTRACT OF THE DISCLOSURE

Alpha,beta-unsaturated aldehydes, ketones, nitriles and esters are formed by the vapor phase condensation of saturated aldehydes, ketones, nitriles and alkyl esters of aliphatic monocarboxylic acids with formaldehyde in the presence of an unmodified silica gel catalyst. The activity and effectiveness of the catalysts is a function of their pore volume and surface area. The use of the silica gel catalyst systems give improved conversions and yields of unsaturated product and is accompanied by retention of catalyst activity at a high level.

---

This invention relates to the syntheses of alpha,beta-unsaturated aldehydes, ketones, nitriles and esters by reaction of formaldehyde with aldehydes, ketones, or alkyl esters of aliphatic monocarboxylic acids which possess at least two hydrogen atoms attached to the alpha carbon. It further relates to a vapor phase condensation of formaldehyde with the said aldehydes, ketones, nitriles and alkyl esters of aliphatic monocarboxylic acids in the presence of silica gel catalyst to produce alpha,beta-unsaturated aldehydes, ketones, nitriles and esters. In addition, this invention relates to a new class of catalysts for formaldehyde condensation with aldehydes, ketones, nitriles and esters.

It is known that aldehydes, ketones, nitriles and aliphatic esters will undergo catalytic condensation with formaldehyde gas to give acrylic monomers. Thus, methyl acetate can be converted to methyl acrylate and methyl propionate to methyl methacrylate by passing the saturated ester and formaldehyde vapor over a lead acetate on silica gel catalyst at 325–425° C. Similarly the use of a solid basic metal fluidized catalyst for the ester-aldehyde condensation in the syntheses of acrylic ester is known. The catalyst is a basic metal compound of manganese oxide or lead oxide supported on a carrier selected from a group consisting of activated silica and activated alumina. Furthermore, it is known in the art to prepare methyl acrylate and methyl methacrylate by the vapor phase condensation of formaldehyde with methyl acetate and methyl propionate, respectively, in the presence of fixed bed zeolite and modified silica catalysts. The catalyst may consist of potassium hydroxide impregnated on silica gel, wherein the potassium hydroxide is present within the range of from 0.5 percent to 2 percent by weight. Alkali metal borates on silica gel are also known. In addition, processes have been described in the art for making acrylic esters from a vapor phase mixture of methanol, formaldehyde, and aliphatic acids over various zeolites and modified silica catalysts.

An object of this invention is to produce alpha,beta-unsaturated aldehydes, ketones, nitriles and esters by reaction of formaldehyde with alkyl esters of aliphatic monocarboxylic acids, aldehydes, ketones or nitriles which possess at least two hydrogen atoms attached to the alpha carbon.

Another object is to provide a process for the vapor phase condensation of formaldehyde with aldehydes, ketones, nitriles and the alkyl esters of aliphatic monocarboxylic acids in the presence of a catalyst.

Still another object is to provide silica gel catalysts for use in a vapor phase condensation of formaldehyde with aldehydes, ketones, nitriles or alkyl esters of aliphatic monocarboxylic acids, which catalysts give superior conversions and yields to the unsaturated aldehydes, ketones, nitriles and esters with little by-product formation and which have longer lifetimes as compared to prior art catalysts.

These and other objects are attained by the practice of this invention which, briefly, comprises contacting a gaseous mixture of formaldehyde with aldehydes, ketones, nitriles or alkyl esters of aliphatic monocarboxylic acids, which possess at least two hydrogen atoms attached to the alpha carbon, with a specific type of silica gel catalyst, described in detail hereinafter, and recovering the product.

More specifically, the unsaturated aldehydes, ketones, nitriles and esters are obtained by reacting, in the vapor phase and at elevated temperatures over a silica gel catalyst, formaldehyde and a compound selected from the group consisting of an alkyl ester of an aliphatic carboxylic acid of the formula R—CH$_2$—COOR$^1$, and aldehyde of the formula R$^2$—CH$_2$—CHO, a ketone of the formula

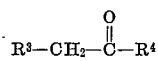

and a nitrile of the formula R$^5$CH$_2$CN wherein the substituents R, R$^2$, R$^3$ and R$^5$ are selected from the group consisting of hydrogen and (lower) alkyl groups having from 1 to 6 carbon atoms and R$^1$ and R$^4$ are (lower) alkyl groups having from 1 to 6 carbon atoms. The alpha, beta-ethylenically unsaturated aliphatic products can be recovered from the reaction product by fractional distillation under reduced pressure.

The alpha carbon of esters such as methyl propionate, methyl acetate, ethyl acetate, methyl butyrate, etc., of aldehydes such as acetaldehyde, propionaldehyde, butyraldehyde, etc., of ketones such as acetone, methyl ethyl ketone, etc. and of nitriles such as propionitrile, butyronitrile, etc. possess at least two hydrogen atoms. Commercially available esters, aldehydes, ketones and nitriles are suitable for use in the process of this invention.

Formaldehyde such as aqueous, alcoholic or polymeric formaldehyde obtained from commercial sources may be used in the practice of this invention.

In the process of the invention, the reactants are passed through the catalyst bed in the gaseous state. The reactants can be preheated either in a suitably proportioned mixture or separately before being introduced into the reaction system. The reaction proceeds best at about 350–525° C., and preferably at about 425–500° C. Molar ratio of ester, aldehyde, ketone or nitrile to formaldehyde in a range of 1:1 to 25:1, preferably 1:1 to 20:1, can be employed in the practice of the invention.

The prior art teaches the use of basic metal compounds impregnated on silica gel as catalysts in the vapor phase condensation of compounds possessing at least two hydrogen atoms attached to the alpha carbon atom with formaldehyde. As is demonstrated in Examples 4 and 5, the prior art catalysts give low conversions to and yields of unsaturated product.

The catalyst systems of the invention are silica gel catalysts. These silica gel catalysts are unmodified, e.g., they are essentially metal free, thus differing radically from the teachings of the prior art. In addition, the activity and performances of the silgica gel catalysts are a function of the pore volume and surface area. The silica gel catalysts which afford the highest conversions and yields to unsaturated product possess a pore volume greater than 0.30 cc./g. and a surface area less than 600 m.²/g.

The silica gel catalysts of the instant invention obtain superior conversions and yields to the unsaturated aldehydes, ketones, nitriles and esters accompanied with minimal by-product formation in comparison to the prior art catalysts systems, of which Examples 4 and 5 are illustrative. Another very important advantage of our silica gel catalyst systems is the retention of their activity at a higher level for a longer period of use in comparison to the prior art catalysts. In the accompanying drawing, the silica gel catalysts of the invention (as represented by the solid line curve) have a more gradual drop in activity and maintain their activity at an appreciably higher level than the prior art catalyst systems, represented by the dotted line curve. Thus the effectiveness of the silica gel catalyst systems is considerably enhanced, resulting in higher conversions and yields with a reduction in by-product formation.

This invention will be further illustrated by the following examples, although it will be understood that these examples are included merely for purposes of illustration and are not intended to limit the scope of the invention. The reaction system utilized in performing the examples of the invention comprises a calibrated reservoir, metering pump, preheater, catalyst tube and condensing system.

EXAMPLE 1

A gaseous mixture of methyl propionate and methanolic formaldehyde was passed through a catalyst bed at atmospheric pressure, at a temperature of 490° C., and a contact time of 3 seconds over the catalyst. The formaldehyde used was a commercial methanolic solution containing 46.5 percent formaldehyde, 44.5 percent methanol, and 9 percent water. The catalyst consisted of a silica gel with a pore volume of 1.16 cc./g. and a surface area of 340 m.²/g. The mole ratio of methyl propionate to formaldehyde is shown in Table I below. The percentage conversion and yield to methyl methacrylate are based on formaldehyde.

TABLE I

[Methyl propionate: Formaldehyde condensation]

| Run No. | Ester:CH₂O mole ratio | Percent conversion | Percent yield |
| --- | --- | --- | --- |
| 1 | 5:1 | 38 | 76 |
| 2 | 1:1 | 8 | 68 |
| 3 | 3:1 | 24 | 83 |
| 4 | 10:1 | 34 | 75 |
| 5 | 15:1 | 40 | 92 |
| 6 | 20:1 | 46 | 94 |

EXAMPLE 2

A gaseous mixture of methyl acetate and methanolic formaldehyde was passed through a catalyst bed at atmospheric pressure, at a temperature of 475–490° C., and a contact time of 3 seconds over the catalyst. The formaldehyde used was a commercial methanolic solution. The catalyst was a silica gel with a pore volume of 1.16 cc./g. and a surface area of 340 m.²/g. The mole ratio of methyl acetate to formaldehyde is shown in Table II below. Conversions and yields to methyl acrylate are based on formaldehyde.

TABLE II

[Methyo acetate: Formaldehyde condensation]

| Run No. | Ester:CH₂O mole ratio | Percent conversion | Percent yield |
| --- | --- | --- | --- |
| 1 | 3:1 | 20 | 88 |
| 2 | 5:1 | 29 | 78 |
| 3 | 10:1 | 41 | 96 |
| 4 | 15:1 | 42 | 95 |
| 5 | 20:1 | 45 | 96 |

EXAMPLE 3

A gaseous mixture of methyl acetate and trioxane was passed through a catalyst bed at atmospheric pressures, at a temperature of 485–495° C., and a contact time of 3 seconds. The catalyst was a silica gel with a 1.16 cc./g. pore volume and a 340 m.²/g. surface area. The 5:1 molar ratio of methyl acetate to formaldehyde gave a 15 percent conversion to methyl acrylate from formaldehyde and a 33 percent yield.

EXAMPLE 4

A gaseous mixture of methyl propionate and methanolic formaldehyde was passed through a catalyst bed consisting of a basic metal compound impregnated on silica gel at atmospheric pressures and at a temperature of 360–375° C. The formaldehyde used was a commercial solution containing 46.5 percent formaldehyde, 44.5 percent methanol, and 9 percent water. The mole ratio of methyl propionate to formaldehyde, and the amount of potassium hydroxide in the catalyst in each run, are shown in Table III below. The percentage conversion and yields to methyl methacrylate are based on formaldehyde.

TABLE III

| Run | Percent KOH on SiO₂ gel | Ester:CH₂O mole ratio | Percent Conversion | Percent yield |
| --- | --- | --- | --- | --- |
| 1 | 3 | 5:2 | 6 | 15 |
| 2 | 3 | 5:1 | 10 | 20 |
| 3 | 10 | 5:1 | 5 | 12 |

EXAMPLE 5

A gaseous mixture of methyl propionate and trioxane was passed through a catalyst bed consisting of a basic metal compound impregnated on silica gel at atmospheric pressures and at a temperature of 360–375° C. The mole ratio of methyl propionate to formaldehyde, and the amount of potassium hydroxide on the catalyst in each run, are shown in Table IV below. The percent conversions and yields to methyl methacrylate are based on formaldehyde.

TABLE IV

| Run | Percent KOH on silica gel | Ester:CH₂O mole ratio | Percent Conversion | Percent yield |
| --- | --- | --- | --- | --- |
| 1 | 3 | 5:1 | 8 | 14 |
| 2 | 10 | 5:1 | 3 | 6 |
| 3 | 3 | 10:1 | 14 | 26 |
| 4 | 1 | 10:1 | 6 | 19 |

EXAMPLE 6

A gaseous mixture of an aldehyde, ketone, or nitrile and methanolic formaldehyde was passed through a catalyst bed at atmospheric pressure, at a temperature of 460–490° C., and a contact time of 3 seconds over the catalyst. The formaldehyde used was a commercial methanolic solution containing 46.5 percent formaldehyde, 44.5 percent methanol, and 9 percent water. The catalyst consisted of a silica gel with a pore volume of 1.16 cc./g. and a surface area of 340 m.²/g. The various aldehydes ketones, and nitriles reacted with the formaldehyde are shown below in Tables V, VI, and VII, respectively. A 3:1 mole ratio of aldehyde, ketone, or nitrile to formaldehyde was utilized in these condensations. Conversions and yields to the alpha,beta-unsaturated product are based on folmaldehyde.

TABLE V

[Aldehyde: Formaldehyde condensation]

R—CHO

| Run No. | R | Percent conversion | Percent yield |
| --- | --- | --- | --- |
| 1 | CH₃ | 39 | 88 |
| 2 | CH₃CH₂ | 45 | 92 |
| 3 | CH₃CH₂CH₂ | 35 | 94 |

TABLE VI
[Ketone: Formaldehyde condensation]

$$R-\overset{\overset{O}{\|}}{C}-R_1$$

| Run No. | R | $R_1$ | Percent conversion | Percent yield |
|---|---|---|---|---|
| 1 | $CH_3$ | $CH_3$ | 39 | 87 |
| 2 | $CH_3$ | $CH_3CH_2$ | 43 | 91 |

TABLE VII
[Nitrile: Formaldehyde condensation]

R—CN

| Run No. | R | Percent conversion | Percent yield |
|---|---|---|---|
| 1 | $CH_3$ | 17 | 20 |
| 2 | $CH_3CH_2$ | 31 | 87 |
| 3 | $CH_3CH_2CH_2$ | 28 | 85 |

EXAMPLE 7

Under the general conditions of Example 1, reactions of methyl propionate and formaldehyde at temperatures within the range of 450–500° C. were run using catalysts having varying pore volume and surface area as indicated by Table VIII. Conversions and yields to the methyl methacrylate are based on formaldehyde.

TABLE VIII
[Methyl propionate—formaldehyde condensations]

| Run No. | Pore volume, cc./g. | Surface area, m.²/g. | Conversion, percent | Yield, percent |
|---|---|---|---|---|
| 1 | 1.16 | 340 | 45 | 80 |
| 2 | 1.15 | 340 | 27 | 81 |
| 3 | 0.38 | 166 | 26 | 93 |
| 4 | 0.38 | 600 | 6 | 11 |
| 5 | 0.45 | 832 | 8 | 12 |
| 6 | 0.45 | 743 | 5 | 8 |

The invention has been described in detail with particular reference to preferred embodiments thereof, but it will be understood that variations and modifications can be effected within the spirit and scope of the invention as described hereinbefore.

We claim:
1. A process for the preparation of alpha,beta-unsaturated nitriles by the catalytic vapor phase condensation of a mixture of formaldehyde and an aliphatic nitrile; said nitrile possessing at least two hydrogen atoms attached to the alpha carbon atom and having the general formula $R^5$—$CH_2$—CN wherein $R^5$ is hydrogen or alkyl of 1 to 6 carbon atoms in the presence of a catalyst consisting essentially of silica gel having a pore volume greater than 0.30 cc./g. and a surface area less than 600 m.²/g.

2. A process according to claim 1 in which the temperature is in the range of 350–525° C.

3. A process according to claim 1 in which the proportion of nitrile to formaldehyde is within the mole ratio of 1:1 to 25:1.

4. A process according to claim 1 in which the nitrile is selected from the group consisting of acetonitrile, propionitrile and butyronitrile.

5. A process according to claim 1 wherein said silica gel is essentially metal-free.

References Cited
UNITED STATES PATENTS

| | | | |
|---|---|---|---|
| 2,386,586 | 10/1945 | Brant et al. | 260—465.9X |
| 3,089,900 | 5/1963 | Vitcha et al. | 260—486 |
| 3,089,901 | 5/1963 | Vitcha et al. | 260—486 |
| 3,089,902 | 5/1963 | Vitcha et al. | 260—486 |

JOSEPH P. BRUST, Primary Examiner

U.S. Cl. X.R.

260—486, 593, 601